United States Patent
Maier, Jr. et al.

(10) Patent No.: US 6,895,891 B2
(45) Date of Patent: May 24, 2005

(54) TUBE SLEEVE FOR A MILKING TUBE

(75) Inventors: Jakob Maier, Jr., Griesstrasse 4, D-86842 Tuerkheim (DE); Wilfried Hatzack, Tuerkheim (DE)

(73) Assignee: Jakob Maier, Jr., Tuerkheim (DE)

( * ) Notice: Subject to any disclaimer, the term of this patent is extended or adjusted under 35 U.S.C. 154(b) by 0 days.

(21) Appl. No.: 10/275,759

(22) PCT Filed: May 9, 2001

(86) PCT No.: PCT/EP01/05293
§ 371 (c)(1),
(2), (4) Date: Jul. 31, 2003

(87) PCT Pub. No.: WO01/84913
PCT Pub. Date: Nov. 15, 2001

(65) Prior Publication Data
US 2004/0025794 A1 Feb. 12, 2004

(30) Foreign Application Priority Data
May 10, 2000 (DE) .......................... 100 22 716

(51) Int. Cl.⁷ ................................. A01J 5/04
(52) U.S. Cl. ................. 119/14.51; 119/14.54
(58) Field of Search ............. 119/14.47, 14.48, 119/14.49, 14.5, 14.51, 14.52, 14.53, 14.54, 14.55

(56) References Cited
U.S. PATENT DOCUMENTS 3,999,516 A    12/1976  Shulick ...................... 119/14.1
4,869,205 A    9/1989   Larson ...................... 119/14.51
6,161,502 A  * 12/2000  Simpson et al. .......... 119/14.55

FOREIGN PATENT DOCUMENTS

| DE | 1 607 023 | 8/1970 |
| DE | 32 17 865 | 1/1983 |
| DE | 43 04 246 | 8/1994 |
| DE | 199 22 131 | 3/2001 |
| FR | 1 594 929 | 7/1970 |
| GB | 2 145 915 | 4/1985 |

* cited by examiner

Primary Examiner—Robert P. Swiatek
(74) Attorney, Agent, or Firm—Flynn, Thiel, Boutell & Tanis, P.C.

(57) ABSTRACT

An automatic milking plant includes a teat cup connected via a flexible connection hose to a collecting piece for collecting extracted milk and for transmitting a vacuum required for milking. The collecting piece is provided with a connecting piece for the flexible connection hose. The connecting piece and/or the flexible connection hose are implemented such that the flexible connection hose is stiffened in the connection zone of the connecting piece and that the stiffened region of the flexible connection hose extends beyond a milk-carrying area of the connecting piece in the axial direction. An end of a hose sleeve which faces away from the connecting piece is designed asymmetrically in the longitudinal direction, and the hose sleeve encloses the flexible connection hose at least partially in the area of the connecting piece.

24 Claims, 3 Drawing Sheets

TUBE SLEEVE FOR A MILKING TUBE

FIELD OF THE INVENTION

The present invention relates to an automatic milking plant comprising a teat cup and a teat rubber connected via a flexible connection hose to a collecting piece for collecting extracted milk and for transmitting a vacuum required for milking, the collecting piece being provided with a connecting piece for said flexible connection hose. Furthermore, the present invention relates to a sleeve as well as a hose sleeve for use in an automatic milking plant.

In automatic milking plants elastic, i.e. flexible hose connections are used, on the one hand for conducting the milk stream from the udder of the animal to a suitable collecting tank, and, on the other hand, for providing the milking vacuum, which is necessary for extracting milk, at the teat.

BACKGROUND OF THE INVENTION

In the German patent application having the serial number 199 22 131.6, a flexible milk hose for an automatic milking plant is described. In this known milking plant, the milk is sucked from the teat during the suction phase by means of a teat cup lined with a soft teat rubber. During this suction phase, the teat cup adheres to the teat exclusively on the basis of the operating vacuum prevailing in the plant. The milk sucked off then flows through a flexible connection hose, the so-called short milk hose, into a multiway valve and a collecting piece, respectively; from this collecting piece, the milk is then advanced in various conduit systems into a collecting tank. The teat cups are mechanically coupled to the multiway valve essentially via the four short milk hoses and, consequently, they are also mechanically coupled to one another. The short milk hoses must transmit the milk stream as well as the operating vacuum so that an inner diameter of from 9 mm to 12 mm is necessary. This means that, on the one hand, the milk hoses must have a comparatively large inner diameter and, on the other hand, they should be mechanically stable to such an extent that they will not undergo major deformation when the milking vacuum is being applied and that they will resist the mechanical loads occurring during the milking process and when the milking plant is being handled. Furthermore, according to the hygiene regulations, it must be guaranteed that no foreign matter whatsoever passes from the conduits, such as the milk hose, or from the tanks into the milk, so as to keep the load of harmful substances, bacteria or the like below a limit value specified e.g. in the ordinance concerning milk production. For the health of the animals, it is important to guarantee a high hygienic standard in the milking plant and to prevent especially infections of the udder by a bacterial load on the milking plant. For this purpose, it must be possible to fully remove milk residues especially from the flexible supply conduits and the respective connection areas after the use of the milking plant so as to reduce to a minimum the formation of bacteria in the plant and, consequently, negative effects on the milk and the udder of the animal, Hence, it is the object of the present invention to achieve an improvement of the known milking plants insofar as, especially at the connection points, where flexible elements are connected to rigid elements, the properties of the plant are improved, especially as far as cleaning of said plant is concerned.

This object is achieved by an automatic milking plant of the type mentioned at the start, wherein the connecting piece and/or the flexible connection hose are implemented such that, when a bending load is applied to the flexible connection hose and especially when the flexible connection hose kinks, a partial detachment of the flexible connection hose from the connecting piece is prevented in the connection zone of the connecting piece, wherein a hose sleeve enclosing the flexible connection hose at least partially is provided in the connection zone, and the end portion of the hose sleeve facing away from the connecting piece is designed asymmetrically In the longitudinal direction In such a way that said away-facing end portion matches an asymmetrical shape of the connection zone of the connecting piece in the longitudinal direction.

In accordance with a further aspect of the present invention, this object is additionally achieved by a hose sleeve for stiffening an end portion of a flexible connection hose in an automatic milking plant, wherein the end portion of the flexible connection hose is adapted to be connected to a connecting piece of a collecting piece. The hose sleeve is characterized in that its length exceeds its inner diameter, the inner diameter being chosen such that a tight fit of the hose sleeve on the flexible connection hose is guaranteed, when said connection hose is connected to the connecting piece, and the length being sufficient for stiffening the flexible connection hose beyond the connecting piece, the end portion of the hose sleeve which faces away from the connecting piece being designed asymmetrically in the longitudinal direction in such a way that said away-facing end portion matches an asymmetrical shape of the connection zone of the connecting piece in the longitudinal direction. The ratio of the length of the hose sleeve to the inner diameter of said hose sleeve is preferably at least 1.5.

In order to elucidate the advantage which the present invention offers in comparison with the prior art, the known milking plant will here be described in detail making reference to FIG. 1. FIG. 1 shows the fundamental structural design of a milking unit making use of short milk hoses. Reference numeral 1 designates the four teat cups, at one end of which the bulge of a teat rubber 2 is formed. On the other end of the teat cup 1, an outlet neck 3 is provided, an end portion 9 of a short milk hose 4 being pushed onto said outlet neck. The other end of the milk hose 4 is pushed onto a connecting piece 8 of a multiway valve and a collecting piece 5, respectively. In FIG. 1, three of the teat cups 1 are oriented approximately vertically. This corresponds essentially to the operating position of the teat cups 1 during the milking process. The fourth teat cup is shown in a hanging position, which will occur whenever the teat cup is removed from the teat, e.g. when the teat cups start to be removed from a fully milked animal.

Due to the bend of the milk hose 4 at the transition to the connecting piece 8, a small intermediate area 10 between the inner surface of the milk hose 4 and the opposed outer surface of the connecting piece 8 forms between the milk hose and the connecting piece. Due to this intermediate area 10, the outer surface of the connecting piece 8 and the respective surface on the inner side of the milk hose 4 are wetted with milk, which, after the removal of the teat cup 1 from the teat, is still present in the area leading from the teat cup to the collecting piece 5. When milking is then continued and especially when the milking unit is being cleaned, the teat cups 1 are again in the operating position, i.e. all the milk hoses are oriented in the preferred direction determined by the connecting pieces, and the intermediate area 10 between the connecting piece 8 and the short milk hose 4 will not be formed, consequently. Hence, the surfaces on the connecting piece 8 and on the milk hose 4 wetted with milk will not be cleaned. This leads to a formation of bacteria in this area, which will, in the final analysis, impair the quality of the milk as well as the health of the udder of the animal in question.

In the milking plant according to the present invention and also by means of the hose sleeve according to the present invention, which projects beyond the connecting piece 8, this formation of the intermediate area 10 is avoided, since, in the case of kinking of the milk hose, the resultant bending edge or kinking edge is located at a considerable distance from a milk-carrying area of the connecting piece so that an improved cleaning effect is achieved when the plant is being rinsed.

In the milking plant according to the present invention comprising a connecting piece with an asymmetrically designed opening, the desired effect will also be achieved when a sleeve is used on the connecting piece or in the flexible connection hose. This is due to the fact that the sleeve, which can in this case also be referred to as interior sleeve, ends such that it is at least flush with the asymmetrical opening of the connecting piece, whereby a force directed towards the hose interior will occur in the area of the smaller bending radius when the flexible connection hose kinks, said force preventing thus a partial detachment of the connection hose and, consequently, the formation of the intermediate area 10 in an effective way.

Another advantage is obtained on the basis of the fact that, when the flexible connection hose kinks upon removal of the teat cup, the vacuum in the collecting piece will be preserved due to the precise axial definition of the kinking area of the connection hose according to the present invention, since the kinking area will seal the collecting piece from the external pressure prevailing in the teat cup which will then hang down. This is particularly advantageous when the milking unit is being removed, since, if the vacuum ceased to exist at the remaining teat cups which are still attached to the teats, these teat cups would simply fall off.

By means of the hose sleeve the flexible connection hose is stiffened beyond the milk-carrying area so that a detachment of the hose from the connecting piece does not take place. Furthermore, an existing milking plant can easily be retrofitted so that the advantages according to the present invention can also be utilized for older plants.

The asymmetrical structural design provides the additional advantage that the generally asymmetrical opening of the connecting piece is approximately mirrored by the second end portion so that a formation of the intermediate area is avoided; the opening of the connecting piece can, however, still be observed, provided that the milk hose consists of an at least partially transparent material. Furthermore, the hose sleeve can be attached and removed easily.

In accordance with another advantageous further development of the present invention, the away-facing end portion and the other end portion of the hose sleeve have a circular cross-section.

This structural design of the two end portions guarantees that the hose sleeve can be attached easily to the milk hose and that it can be produced at a reasonable price.

In accordance with a preferred further development, the away-facing end portion has an oval cross-section.

Due to the oval cross-section of the second end portion, the milk hose is slightly deformed so that, when the milk hose kinks, a preferred direction is formed along the larger diameter of the cross-section, whereby kinking of the milk hose in an undesired direction can be prevented.

In accordance with another preferred embodiment of the present invention, the second end portion has on part of its inner wall a depression and/or an elevation which is adapted to be brought into engagement with a complementary elevation and/or depression on the, outer wall of the flexible connection hose.

By means of this measure, a durable and reliable connection between the hose sleeve and the connection hose is obtained, the position of the hose sleeve and of the milk hose relative to one another being maintained due to the "locking engagement" of the respective depression and elevation, It will be advantageous when the hose sleeve is produced from one piece.

This permits an economical production of the hose sleeve at a reasonable price.

In a preferred embodiment of the present invention, the hose sleeve comprises a clamping device for fixing the hose sleeve in position on the milk hose.

In this way, it can be guaranteed that the hose sleeve can easily be attached to and reliably fastened on the milk hose.

In a preferred further development of the present invention, the hose sleeve comprises two shell components.

The hose sleeve can in this way easily be mounted on the milk hose, when the milk hose has already been fastened to the connecting piece of the collecting piece.

In accordance with an advantageous embodiment, the two shell components are connected by a hinge element.

It will be advantageous when at least part of the hose sleeve is produced from an inelastic material.

This results in a high mechanical durability, e.g. when the hoof of the animal comes into contact with the hose sleeve and when part of the weight of the animal has to be borne by the hose sleeve in this case.

In a preferred further development of the milking plant according to the present Invention, the flexible connection hose is provided with a predetermined kinking point prior to the stiffened area when seen in the direction of the hose centre.

By providing a predetermined kinking point prior to the hose sleeve, it is guaranteed that, forming a prominent kinking edge, the milk hose will kink when the teat cup is removed from the teat and hangs down. By means of this prominent kinking edge, the sealing properties of the milk hose will be improved for delimiting the milking vacuum, which is still applied to the collecting piece, from the atmospheric pressure applied to the kinking edge through the open teat cup, said sealing properties being even improved in the case of a swinging movement of the teat cup or teat cups which hang(s) down.

In a preferred further development, the flexible connection hose is, at least partially, transparent, and the away-facing end portion of the hose sleeve is provided with a cut-out portion in such a way that, in the pushed-on condition, the end portion of the connecting piece is visible.

The condition of the connecting piece and the surface wetting at the end portion of the connecting piece can easily be observed in this way.

Furthermore, the flexible connection hose is formed integrally with the teat rubber in an advantageous manner.

In addition, the sleeve for the asymmetrical opening of the connecting piece can be provided in the form of a separate, removable sleeve or as an integral component of the flexible connection hose.

BRIEF DESCRIPTION OF THE DRAWINGS

FIG. 3b shows a cross-section taken at IIIb in FIG. 3a; and

Making reference to FIG. 2a, first embodiment of the present invention will now be described. Furthermore, components which have already been explained hereinbefore in connection with FIG. 1 are designated by the same reference numerals and a description of these components is dispensed with.

FIG. 2a shows a schematic side view of a hose sleeve 20 and of a short milk hose 4. The hose sleeve 20 comprises a first end portion 21 and a second end portion 22. The second end portion 22 is implemented such that its area shown in FIG. 2a, below, encloses approximately a quarter of the total circumference of the hose sleeve. Furthermore, a depression is formed in this lower area radially on the inner side of the hose sleeve 20, said depression engaging an elevation 24 of the milk hose 4 when the hose sleeve is pushed on in the direction indicated by arrow 23. Furthermore, a connecting piece 8 of a collecting piece, which is not shown, is depicted in the figure by a broken line so as to show the position of the connecting piece 8 relative to the position of the hose sleeve 20, when the hose sleeve including the milk hose 4 has been pushed onto the connecting piece 8. As can be seen from the figure, the stiffening by means of the hose sleeve 20, which extends beyond the length of the connecting piece 8, prevents the formation of an intermediate area between the inner surface of the milk hose 4 and the outer surface of the connecting piece 8, when the milk hose is kinked downwards. In addition, the hose sleeve is implemented such that an edge 25, beyond which the second end portion 22 encloses the whole radius of the milk hose 4, is adapted to be positioned such that the edge 25 is located in the ascending area of the end of the connecting piece 8. This, too, will prevent the formation of an intermediate space between the connecting piece 8 and the milk hose 4, in case the milk hose should be kinked upwards in FIG. 2a. It should also be mentioned that the asymmetric design of the second end portion 22 in the form shown in FIG. 2a permits an observation of the. inlet area of the connecting piece 8, when the milk hose 4 is made of an at least partially transparent material.

Figure 1:
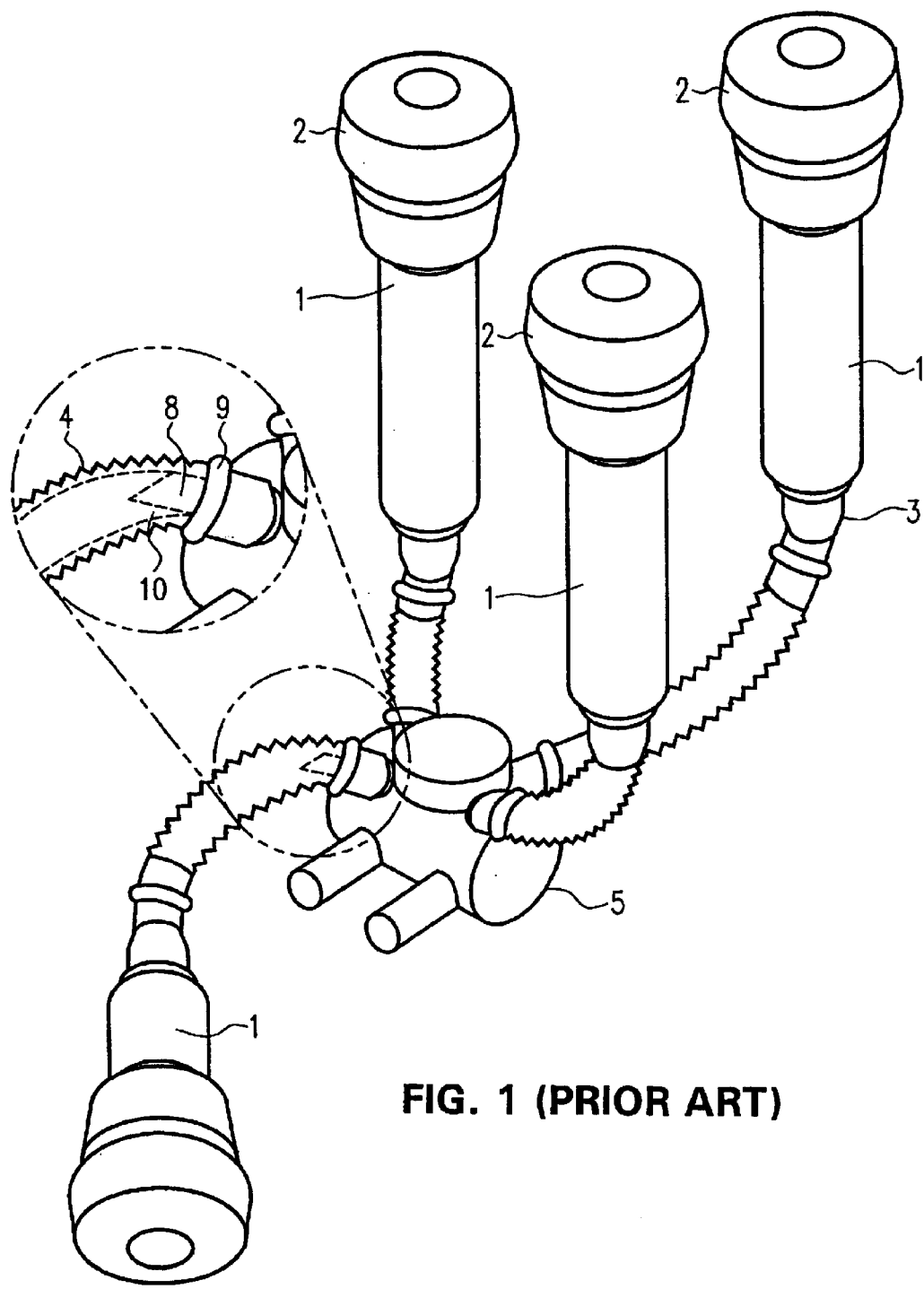
FIG. 1 shows a schematic, three-dimensional representation of a known milking unit.

The advantage of preventing an intermediate space between the milk hose 4 and the connecting piece 8, when the milk hose is kinked, and the resultant wetting of the respective surface area is, of course, also achieved when the second end portion 22 is designed symmetrically in the longitudinal direction, i.e. when it has the shape of a tubular piece. Furthermore, the hose sleeve 20 of this embodiment is formed in one piece and made of a hard plastic material, whereby a product having a long service life and entailing little manufacturing costs is obtained. The hose sleeve 20 can, however, be produced from an arbitrary suitable material, such as metal, ceramics, etc,. The material is preferably sufficiently strong for resisting the mechanical stress to which the hose sleeve will be subjected when trodden on by the animal to be milked.

In addition, it is not necessary that the hose sleeve 20 fully encompasses the milk hose 4 beyond the edge 25, as shown in the present embodiment. Furthermore, the inner diameter of the hose sleeve 20 is preferably chosen such that it is slightly smaller than the outer diameter of the milk hose 4 so that the hose sleeve 20 can be pushed on and drawn off easily, a displacement in the longitudinal direction also being avoided in this way, when the milking plant is in operation.

Figure 2A:
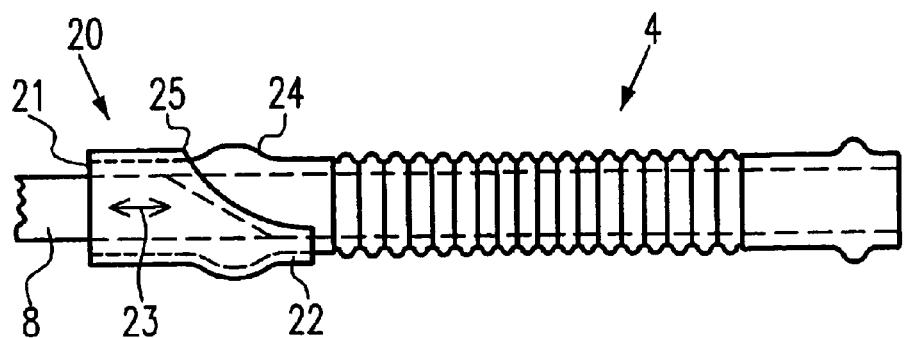
FIG. 2a shows a schematic side view of a first embodiment of the present invention in which a flexible connection hose, a hose sleeve, and a connecting piece are shown.
Figure 2B:
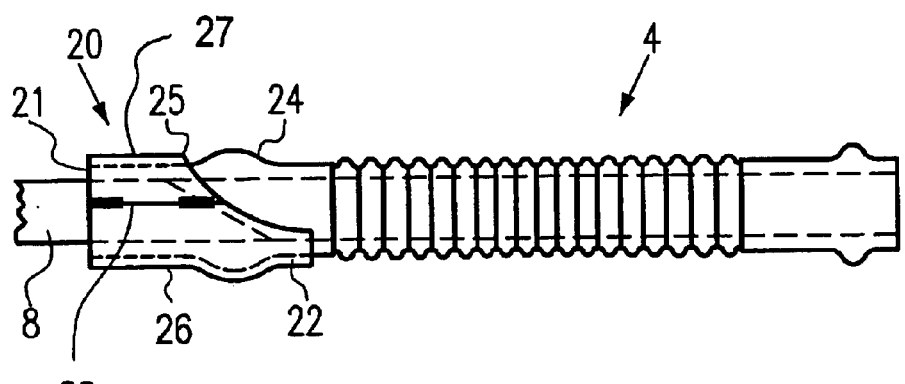
FIG. 2b shows a schematic side view of a further embodiment in which a flexible connection hose, a hose sleeve, and a connecting piece are shown.

Another advantageous embodiment is obtained when the hose sleeve 20 is provided with a clamping device for fixing the hose sleeve in position on the milk hose 4, as shown in FIG. 2b. This kind of fastening is particularly advantageous when the hose sleeve 20 is implemented as a bipartite or as a multi-part component. For example, two half-shells 26, 27 may be provided, which, with the aid of two projections provided at the respective ends of the half-shells, are adapted to be connected to the complementary projections on the other half-shell by means of fastening elements, such as screws. In addition, the two half-shells may be interconnected by a hinge element 28 so that the hose sleeve 20 can be opened and arrested on the milk hose by means of a clamping device. On the basis of the multi-part structural design of the hose sleeve 20, the hose sleeves can easily be attached to the milk hoses 4 which have already been mounted on the connecting pieces 8, without any necessity of drawing the milk hoses off and pushing them, subsequently, onto the connecting pieces 8 in a time-consuming and troublesome operation.

Figure 3A:
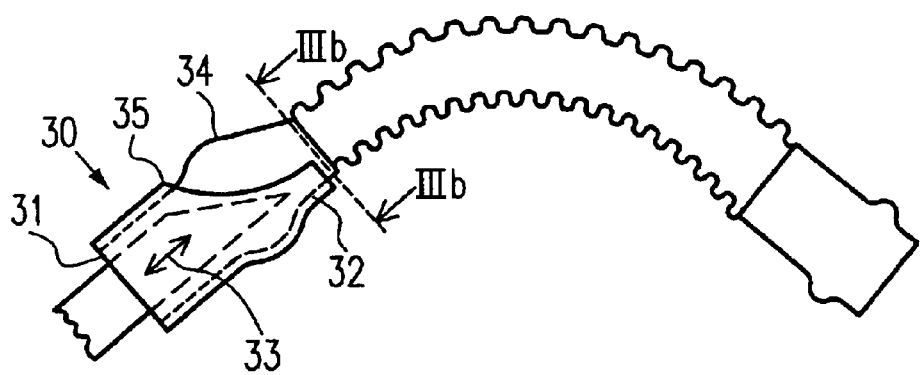
FIG. 3a shows a schematic side view of a further embodiment, in which a connection hose, a hose sleeve and a connecting piece are shown.
Figure 3B:
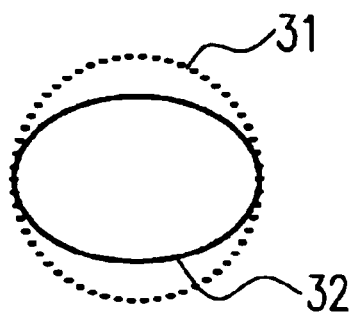

FIGS. 3a and 3b show another embodiment of a hose sleeve according to the present invention. In FIG. 3a, a hose sleeve 30 comprises a first end portion 31 having a circular cross-section and a second end portion 32 having an oval cross-section. FIG. 3b shows a top view of the opening of the hose sleeve 30 in the longitudinal direction, the oval cross-section of the second end portion 32 being represented by a solid line and the circular cross-section of the first end portion 31 being represented by a broken line. Due to the oval shape of the cross-section of the second end portion 32, a preferred kinking edge will form, when the milk hose, which is not shown, is kinked down in FIG. 3a, e.g. by the weight of the teat cup removed from the teat. Simultaneously, the milk hose is rendered stiffer against torsion as far as lateral loads are concerned.

With regard to the rest of the structural design of the hose sleeve 30, the same aspects, which have already been described hereinbefore with respect to FIG. 2a, apply.

Figure 4:
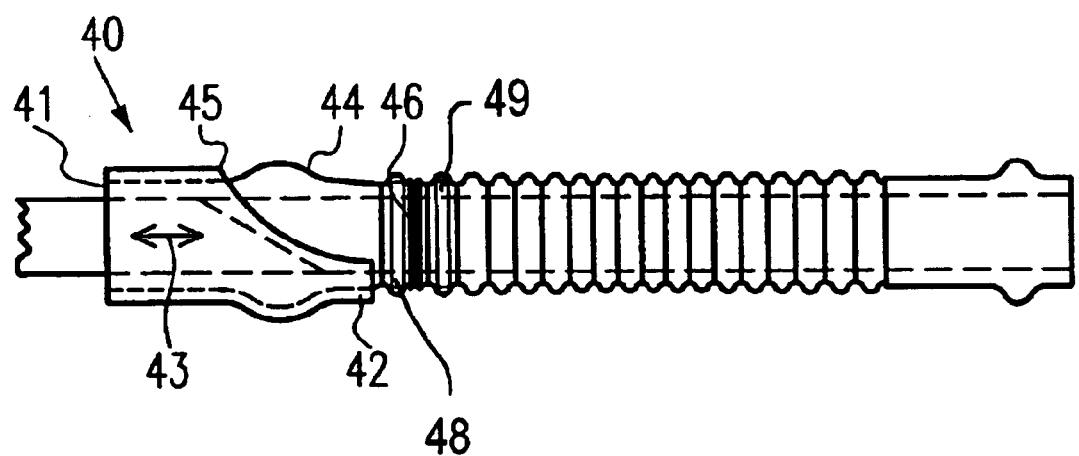
FIG. 4 shows a further preferred embodiment in which only a connection hose with a predetermined kinking point as well as a hose sleeve and a connecting piece are shown.

FIG. 4 shows schematically a side view of a milk hose with the hose sleeve according to the present invention. One end of a milk hose 44 has attached thereto a hose sleeve 40, which can be implemented in the way described hereinbefore with respect to FIGS. 2a and 3. The other end of the milk hose 44 leads to a teat cup, which is not shown here. Furthermore, the milk hose 44 is provided with a predetermined kinking point 46 between an end portion 42 of the hose sleeve 40 and the center piece of the milk hose. The predetermined kinking point 46 can be formed e.g. by a reduction of the wall thickness of the milk hose 44. The kinking point can also be defined by two spaced reinforcement rings 48, 49 located prior to the connecting piece. The predetermined kinking point 46 has the effect that, in the case of a deflection of the milk hose 44, the milk hose will kink in the area of the predetermined kinking point 46 and form a respective kinking edge.

Especially when, upon removal of the teat cup, the milk hose 44 is kinked downwards in FIG. 4 by the weight of said teat cup, a precisely defined kinking area is formed, which has the effect that the milking vacuum applied to the collecting piece and thus to the area on the left hand side (FIG. 4) of the predetermined kinking point 46 is sealed in a particularly efficient manner from the atmospheric pressure coming in through the teat cup. It follows that the operating vacuum is maintained almost unchanged, e.g. during transport of the milking unit from one animal to the next with the teat cups hanging down.

It proves to be particularly advantageous when the milk hose 44 or at least part of the milk hose 44 is produced from a transparent material and when an asymmetrical design of the second end portion 40 is provided so that the user is always easily able to see the area of the opening of the connecting piece. Furthermore, it is also imaginable to form the hose sleeve 40 and the end portion of the milk hose 44 as an integral component, e.g. by incorporating a stiffening area in the milk hose, when said milk hose is being produced.

In accordance with a further embodiment of the milking plant according to the present invention, the connecting piece is implemented like a double-walled tube, the inner tube, which forms the actual connection to the flexible connection hose, being shorter than the outer tube. The distance between the inner tube and the outer tube is dimensioned such that it is slightly smaller than the wall thickness of the end portion of the connection hose to be pushed on, This guarantees that, when the connection hose has been pulled onto the connecting piece, it will be attached firmly to said connecting piece. In addition, due to the fact that the end portion of the connection hose is encompassed completely, optimum protection against any detrimental influences on said end portion will be obtained.

The hose sleeve, which is intended to be used in an automatic milking plant, can be designed in the way described in connection with the embodiments according to the present invention. On the basis of the predetermined ratio of length to inner diameter, it is additionally guaranteed that the end portion is stiffened over a length which is sufficiently long for achieving the desired effect. Since the inner diameter of the flexible connection hose normally ranges from 9 to 12 mm and the wall thickness is normally at least 1 mm, a minimum inner diameter of 13 mm should be provided for the hose sleeve. Depending on the connection hose used, larger values ranging from 13 to 20 mm or exceeding this range may, however, be necessary. It goes without saying that the ratio of the length to the inner diameter may also have other values, e.g. preferably approximately 1.5 and larger. Especially advantageous would be a ratio in the range from 1.5 to 2. The ratio may, however, also be chosen in the range from 2 to 5, so as to achieve the advantageous effect. In the embodiments described with respect to FIGS. 2a to 4, the inner diameter of the hose sleeve is 21 mm and the length 40 mm. In addition, the inner diameter is preferably dimensioned such that it is the hose sleeve is 21 mm and the length 40 mm. In addition, the inner diameter is preferably dimensioned such that it is slightly larger, e.g. by 0.5 mm to 2 mm, than the outer diameter of the flexible connection hose, so that the connection hose can be pushed onto the connecting piece more easily.

In accordance with another embodiment, the asymmetric opening of the connecting piece 8 is encompassed, at least partially, by a sleeve. The length of the sleeve is chosen such that, in the pushed-on condition, the flexible connection hose is in contact with the sleeve, which serves therefore as an inner sleeve, for a length of preferably more than 5 mm, and, in particular for a length of at least 10 mm in the longitudinal direction. The inner sleeve either ends such that it is flush with the opening of the connecting piece or it projects beyond said opening. When the flexible connection hose is bent and kinked, the elasticity of the hose will have the effect that, at the smaller bending radius, a force will occur which is directed towards the larger bending radius and which will therefore press the hose even more firmly against the inner sleeve in this area, whereby the formation of the intermediate area 10 will reliably be prevented.

It will be particularly advantageous to provide a predetermined kinking point, which can be formed e.g. by means of two or more spaced reinforcement rings by the intermediate area defined between two neighbouring rings of this kind.

Furthermore, the teat rubber can be formed integrally with the flexible connection hose in the case of all embodiments.

In addition, it is possible to achieve a milk hose stiffening, which extends up to the end of the opening of the connecting piece or beyond this point, by producing the hose from different materials or mixtures of materials. This can be accomplished e.g. during injection moulding by the use of different mixtures for different hose areas.

What is claimed is:

1. An automatic milking plant comprising:
   a teat cup and a teat rubber connected via a flexible connection hose to a collecting piece for collecting extracted milk and for transmitting a vacuum required for milking, wherein the collecting piece is provided with a connecting piece for the flexible connection hose,
   wherein at least one of the connecting piece and the flexible connection hose are implemented such that, when a bending load is applied to the flexible connection hose and when the flexible connection hose kinks, a partial detachment of the flexible connection hose from the connecting piece is prevented in a connection zone of the connecting piece,
   wherein a hose sleeve enclosing the flexible connection hose at least partially is provided in the connection zone, and the end portion of the hose sleeve facing away from the connecting piece is designed asymmetrically in a longitudinal direction in such a way that said away-facing end portion matches an asymmetrical shape of the connection zone of the connecting piece in the longitudinal direction.

2. The automatic milking plant according to claim 1, wherein an inner diameter of the hose sleeve is, at most, equal to an outer diameter of the flexible connection hose and the hose sleeve projects beyond the connecting piece.

3. The automatic milking plant according to claim 1, wherein the away-facing end portion and the other end portion of the hose sleeve have a circular cross-section.

4. The automatic milking plant according to claim 1, wherein the away-facing end portion has an oval cross-section.

5. The automatic milking plant according to claim 1, wherein the away-facing end portion has on part of its inner wall at least one of a depression and an elevation which is in engagement with at least one of a complementary elevation and depression on an outer wall of the flexible connection hose.

6. The automatic milking plant according to claim 1, wherein the hose sleeve is implemented as a one-piece component.

7. The automatic milking plant according to claim 1, wherein the hose sleeve comprises a clamping device for fixing the hose sleeve in position on the flexible connection hose.

8. The automatic milking plant according to claim 1, wherein the hose sleeve comprises two shell components.

9. The automatic milking plant according to claim 8, wherein the two shell components are connected by a hinge element.

10. The automatic milking plant according to claim 1, wherein at least part of the hose sleeve is produced from an inelastic material.

11. The automatic milking plant according to claim 1, wherein the flexible connection hose is provided with a predetermined kinking point prior to the connecting piece when seen in the direction of the hose center.

12. The automatic milking plant according to claim 1, wherein the flexible connection hose is, at least partially, transparent, and the away-facing end portion of the hose sleeve is provided with a cut-out portion in such a way that, in the pushed-on condition, the end portion of the connecting piece is visible.

13. The automatic milking plant according to claim 1, wherein the flexible connection hose and the teat rubber are formed as a unit.

14. The automatic milking plant according to claim 1, wherein the flexible connection hose has two spaced reinforcement rings located prior to the connecting piece so that a predetermined kinking point is defined between said two reinforcement rings.

15. A hose sleeve for stiffening an end portion of a flexible connection hose in an automatic milking plant, wherein the end portion of the flexible connection hose is adapted to be connected to a connecting piece of a collecting piece, the length of the hose sleeve exceeds an inner diameter of said hose sleeve, wherein the inner diameter is chosen such that a tight fit of the hose sleeve on the flexible connection hose is guaranteed when said connection hose is connected to the connecting piece, and the length is sufficient for stiffening the flexible connection hose beyond the connecting piece, wherein the end portion of the hose sleeve facing away from the connecting piece is designed asymmetrically in a longitudinal direction in such a way that said away-facing end portion matches an asymmetrical shape of a connection zone of the connecting piece in the longitudinal direction.

16. The hose sleeve according to claim 15, wherein the inner diameter is at least 15 mm and the ratio of length to inner diameter has a value of at least 1.5.

17. The hose sleeve according to claim 16, wherein the away-facing end portion has an oval cross-section and the larger diameter has a ratio of length to inner diameter of at least 1.5.

18. The hose sleeve according to claim 15, wherein the away-facing end portion of the hose sleeve and the other end portion of the hose sleeve have a circular cross-section.

19. The hose sleeve according to claim 15, wherein the end portion facing away from the connecting piece has on part of its inner wall a depression and/or an elevation which is adapted to be brought into engagement with a complementary elevation and/or depression on the outer wall of the flexible connection hose.

20. The hose sleeve according to claim 15, wherein the hose sleeve is implemented as a one-piece component.

21. The hose sleeve according to claim 15, wherein the hose sleeve comprises a clamping device for fixing the hose sleeve in position on the flexible connection hose.

22. The hose sleeve according to claim 15, wherein the hose sleeve comprises two shell components.

23. The hose sleeve according to claim 22, wherein the two shell components are connected by a hinge element.

24. The hose sleeve according to claim 15, wherein at least part of the hose sleeve is produced from an inelastic material.

* * * * *